US 7,647,951 B2
Page 1

United States Patent
Larsson et al.

(10) Patent No.: US 7,647,951 B2
(45) Date of Patent: Jan. 19, 2010

(54) FUEL DISPENSING UNIT WITH ON-BOARD REFUELING VAPOR RECOVERY DETECTION

(75) Inventors: Bengt I. Larsson, Skivarp (SE); Marie Hakansson, Malmo (SE); Richard Karlsson, Lund (SE)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 11/861,525

(22) Filed: Sep. 26, 2007

(65) Prior Publication Data

US 2008/0092983 A1 Apr. 24, 2008

(30) Foreign Application Priority Data

Sep. 27, 2006 (EP) .................................. 06121317

(51) Int. Cl.
*B65B 31/04* (2006.01)
*B65B 3/04* (2006.01)

(52) U.S. Cl. ................................ 141/59; 141/7; 141/82; 141/94; 141/290

(58) Field of Classification Search ...................... 141/7, 141/59, 82, 94, 285, 290
See application file for complete search history.

(56) References Cited

U.S. PATENT DOCUMENTS

| | | | | |
|---|---|---|---|---|
| 4,435,978 A | * | 3/1984 | Glatz | 73/152.31 |
| 5,156,199 A | * | 10/1992 | Hartsell et al. | 141/59 |
| 5,592,979 A | * | 1/1997 | Payne et al. | 141/59 |
| 5,671,785 A | | 9/1997 | Andersson | |
| 5,860,457 A | | 1/1999 | Andersson | |
| 5,898,107 A | | 4/1999 | Schenk | |
| 5,956,259 A | | 9/1999 | Hartsell, Jr. et al. | |
| 5,992,395 A | | 11/1999 | Hartsell, Jr. | |
| 6,109,311 A | * | 8/2000 | Fournier et al. | 141/59 |
| 6,167,747 B1 | * | 1/2001 | Koch et al. | 141/59 |
| 6,170,539 B1 | * | 1/2001 | Pope et al. | 141/59 |
| 6,240,982 B1 | * | 6/2001 | Bonne | 141/59 |

(Continued)

FOREIGN PATENT DOCUMENTS

FR 961 744 5/1950

(Continued)

OTHER PUBLICATIONS

Bonne U et al., "Microsensors for Fluid Properties", Scientific Honeyweller, Honeywell's Corporate. Minneapolis, US, 1996.

(Continued)

*Primary Examiner*—Timothy L Maust
*Assistant Examiner*—Nicolas A Arnett
(74) *Attorney, Agent, or Firm*—Fish & Richardson P.C.

(57) ABSTRACT

A vapor recovery system recovers fuel vapor and includes a vapor recovery line for transporting a stream of fuel vapor from a vehicle tank. A flow meter is arranged in the vapor recovery line for indicating the flow rate of the stream of fuel vapor, and a heated element is arranged in the vapor recovery line. One or more controllers are configured to: detect a cooling exerted on the heated element by the stream of fuel vapor, determine a correction for the detected cooling by weighting said cooling with the flow rate, and decrease or stop the stream of fuel vapor, if the detected cooling is smaller than a predetermined level.

13 Claims, 3 Drawing Sheets

U.S. PATENT DOCUMENTS

| | | | | |
|---|---|---|---|---|
| 6,418,981 | B1 * | 7/2002 | Nitecki et al. | 141/4 |
| 6,499,516 | B2 * | 12/2002 | Pope et al. | 141/59 |
| 6,830,080 | B2 * | 12/2004 | Nanaji | 141/59 |
| 7,111,520 | B2 * | 9/2006 | Payne et al. | 73/861.79 |
| 2007/0107799 | A1 * | 5/2007 | Larsson | 141/59 |

FOREIGN PATENT DOCUMENTS

WO     WO 00/50850     8/2000

OTHER PUBLICATIONS

European Search Report for EP 06121317, Mar. 7, 2007, 2 pages.

* cited by examiner

FUEL DISPENSING UNIT WITH ON-BOARD REFUELING VAPOR RECOVERY DETECTION

REFERENCE TO PRIORITY APPLICATION

The present application claims the benefit of European Patent Application No. 06121317.9 which was filed on Sep. 27, 2006.

TECHNICAL FIELD

The present invention relates to a vapor recovery system for recovering fuel vapor from a vehicle tank during dispensing of fuel into the vehicle tank. The vapor recovery system comprises a vapor recovery line for transporting a stream of fuel vapor, and control means for controlling the stream of fuel vapor.

BACKGROUND ART

When filling the fuel tank of a motor vehicle, it is a common measure to recover the vapor escaping the tank when filling it with liquid fuel. This measure is taken for both safety and environmental reasons. The vapor recovery is achieved, for instance, by arranging a vapor suction nozzle next to the fuel dispensing nozzle of a pistol grip for filling the tank with fuel. Vapor is then removed from the tank during filling, at a certain rate, which is often controlled by the standard rate of at which fuel is dispensed to the tank. Vapor recovery systems typically comprise a pump for feeding vapor, from the tank of the vehicle, to the fuel container from which fuel is fed to the vehicle. This mutual exchange of vapor/fuel is continuously performed when filling a vehicle with fuel.

However, today some vehicles are fitted with an on-board refueling vapor recovery (ORVR) system which vents the head space in the vehicle tank through a charcoal-filter, so that the vapor is absorbed by the charcoal.

A fuel dispensing unit fitted with a vapor recovery system but not able to detect vehicles equipped with ORVR systems, will waste energy and will ingest excessive air into the fuel container.

Today several techniques exist for detecting if a vehicle is equipped with an ORVR system.

U.S. Pat. No. 5,956,259, for example, discloses a fuel dispenser system configured to receive a signal from a vehicle transponder indicative of the presence of an ORVR system on the vehicle. If an ORVR equipped vehicle is detected, the fuel dispenser system deactivates its vapor recovery system.

WO 00/50850 discloses a fuel dispensing unit incorporating a vapor recovery system having a density detector for identifying the vapor composition of recovered vapor, and if the vapor is identified as substantially non-hydrocarbon (ORVR equipped vehicle) the operational rate of vapor collection is controlled accordingly.

A problem with existing fuel dispensers capable of detecting ORVR equipped vehicles is that they are relatively complicated and expensive both in respect of construction and production.

SUMMARY OF THE INVENTION

A description is provided for a vapor recovery system for recovering fuel vapor from a vehicle tank during dispensing of fuel into the vehicle tank. The vapor recovery system comprises a vapor recovery line for transporting a stream of fuel vapor, and control means for controlling the stream of fuel vapor. A flow meter is arranged for indicating the flow rate of the stream of fuel vapor, a heated element is arranged in the vapor recovery line, and the control means are configured to: detect a cooling exerted on the heated element by the stream of fuel vapor; determine a correction for the detected cooling by weighting said cooling with the flow rate; and decrease or stop the stream of fuel vapor, if the detected cooling is smaller than a predetermined level.

The inventive fuel dispensing apparatus is advantageous in that the stream of fuel vapor's cooling of the heated element depends on the density of the vapor stream, which means that the cooling increases if the hydrocarbon content of the vapor stream increases. A low hydrocarbon content indicates presence of an ORVR system in the refueled vehicle, while a relatively higher content indicates its absence. If the cooling is sufficiently low, i.e. below a specific level, an ORVR system is present and no vapor is recovered from which vehicle tank. Another advantage is that the system may recover vapor at different rates of vapor flow.

The correction for the detected cooling may comprise increasing said predetermined level as the flow rate increases, for considering that the cooling exerted on the heated element increases as flow of the of the cooling media increases.

The vapor recovery system may comprise a temperature sensor operatively connected to the control means and arranged to measure the temperature of the stream of fuel vapor, and the control means may be configured to determine a correction for the detected cooling by weighting the cooling with the measured temperature, which is advantageous in that the system may recover vapor from fuel tanks having different vapor temperatures.

The correction for the detected cooling may comprise decreasing said predetermined level as the temperature increases, for considering that the cooling exerted on the heated element decreases as the temperature of the cooling media increases.

The flow meter may be arranged in the vapor recovery line and may comprise a fluid oscillator for providing an oscillation of at least a part of the stream of fuel vapor, and the fluid oscillator may be configured to provide a frequency oscillation which increases with an increased vapor flow rate, which provides a reliable measurement of the vapor flow.

The heated element may be arranged at least partly in the oscillating part of the stream of fuel vapor which is advantageous in that efficient and reliable measurement of the cooling is achieved.

The heated element may be supplied with an electrical current for providing the heating of the heated element, and the cooling may be determined by the voltage across, and electrical current through, the heated element, for providing a heated element having a low cost and which is easy to incorporate in present vapor recovery systems.

The control means may be configured to estimate any of the density and the hydrocarbon content of the stream of fuel vapor, based on the cooling exerted on the heated element.

According to another aspect of the invention, a fuel dispensing unit is provided comprising a vapor recovery system according to any of the embodiments described above.

According to yet another aspect of the invention, a method is provided of regulating a vapor recovery system when recovering fuel vapor from a vehicle tank during dispensing of fuel into the vehicle tank. The method comprises the steps of: transporting a stream of fuel vapor through a vapor recovery line; detecting the flow rate of the stream of fuel vapor; detecting a cooling exerted on a heated element by the stream of fuel vapor; determining a correction for the detected cooling by weighting said cooling with the flow rate; and decreasing or stopping the stream of fuel vapor, if the detected cooling is smaller than a predetermined level.

Of course, the inventive method may incorporate any of the features described above in association with the inventive vapor recovery system, and the method has the same advantages as the vapor recovery system.

BRIEF DESCRIPTION OF THE DRAWINGS

Embodiments of the present invention will now be described, by way of example, with reference to the accompanying schematic drawings, in which.

DETAILED DESCRIPTION OF EMBODIMENTS

Figure 1:
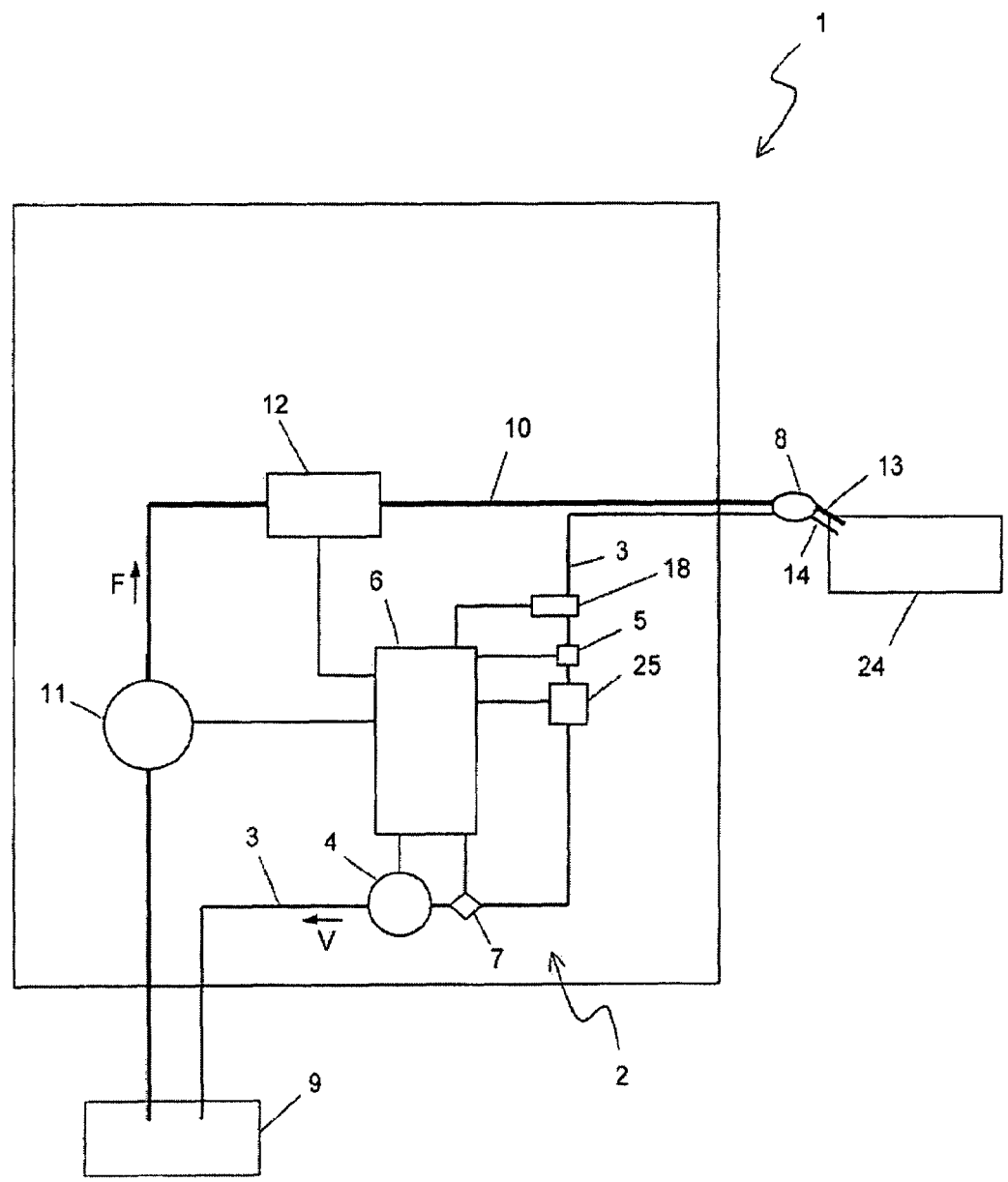
FIG. 1 is a schematic view of a fuel dispensing unit incorporating an ORVR-detecting vapor recovery system.

With reference to FIG. 1, a fuel dispensing unit 1 is illustrated having a fuel line 10 with a fuel pump 11 drawing fuel from a fuel storage tank 9 and producing a stream of fuel F to a fuel dispensing nozzle 8 fitted with a fuel outlet 13. The volume and rate of dispensed fuel is measured by a flow meter 12 arranged in the fuel line 10 and connected to control means 6.

In the fuel dispensing unit 1 a vapor recovery system 2 is provided, in which a vapor line 3 in downstream order comprises a vapor inlet 14 arranged at the fuel dispensing nozzle 8, a temperature sensor 18 for detecting the temperature of a vapor stream V flowing in the vapor line 3, a heated element 5, a vapor flow meter 25, a regulation valve 7 regulating the vapor stream V, and a vapor pump 4 for generating (transporting) the stream of vapor V to the storage tank 9.

During operation, the fuel outlet 13 and the vapor inlet 14 normally are positioned at the fuel inlet (not shown) of a vehicle fuel tank 24.

The fuel pump 11, the vapor regulation valve 7 and the vapor pump 4 are each connected to and controlled by the control means 6. The temperature sensor 18, the heated element 5 and the vapor flow meter 25 are each also connected to the control means 6 for feeding signals corresponding to a vapor stream temperature, a cooling exerted on the heated element 5 by the stream of vapor V, and a vapor flow rate.

Figure 2:
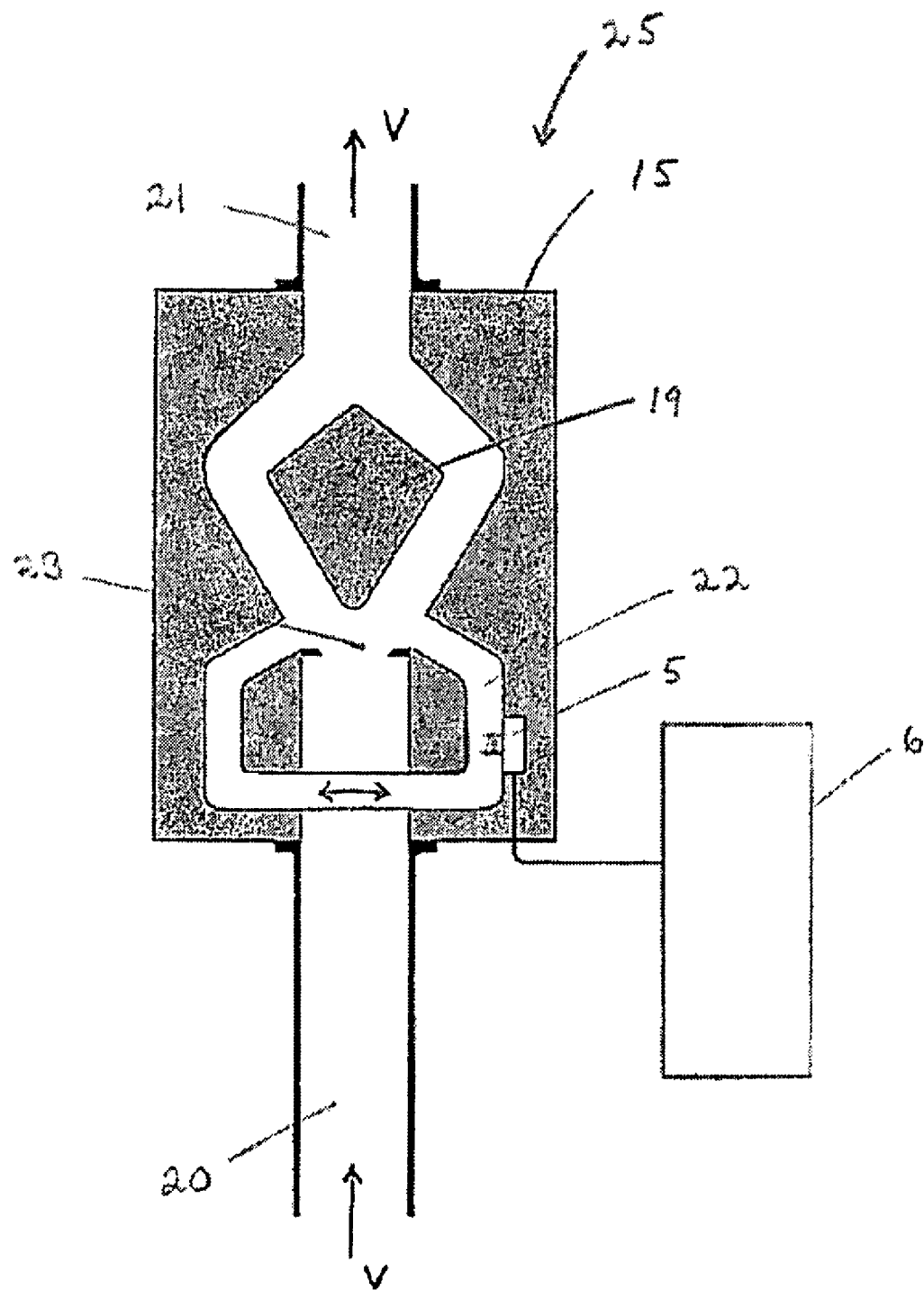
FIG. 2 is a schematic view of a vapor flow meter.

With reference to FIG. 2, the flow meter 25 and heated element 5 are shown incorporated in one unit which is arranged in the fuel line 3 and comprises a conventional fluid oscillator 15 having an inlet 20 and an outlet 21 for allowing passage of the stream of vapor V.

After the inlet 20 the oscillator 15 has a flow passage 23 which in combination with a splitter 19, divides the vapor stream V and creates an oscillation in an oscillation channel 22. The channel 22 is in fluid communication with a respective side of the flow passage 23 and oscillates a part of the stream of fuel vapor V with a frequency proportional to the vapor flow rate.

A pressure detector (not shown) is arranged in the oscillation channel 22 and provides in a known manner a signal indicative of the oscillation frequency, i.e. the vapor flow rate. It is also possible to arrange a heated unit (not shown) in the fluid oscillation channel 22, for providing a signal representative of the frequency of the oscillation, which is detected by sensing the frequency of a cooling exerted on the heated unit. The heated unit may be similar to the heated element 5.

The heated element 5 is also arranged in the oscillation channel 22 and provides a signal indicating a cooling exerted on the element 5 by the stream of vapor V.

Figure 3:
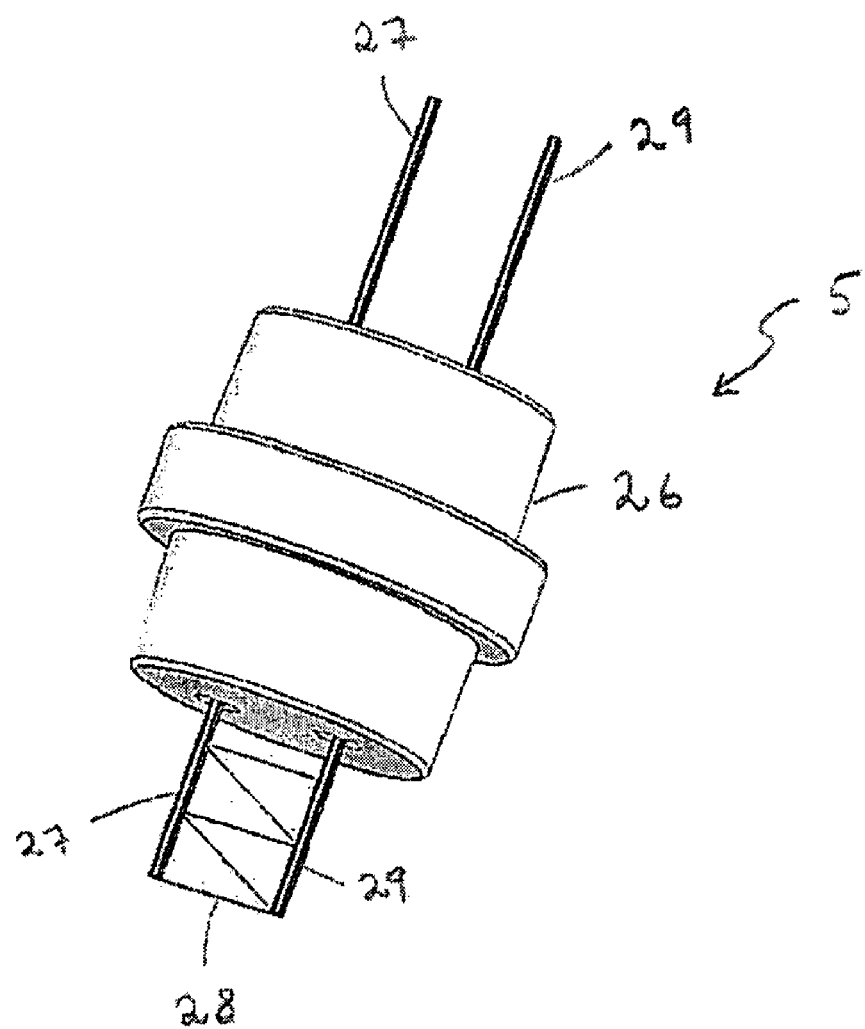
FIG. 3 is a perspective view of a heated element.

With reference to FIG. 3 the heated element 5 has a body 26 for attachment to the oscillator 15 and two prongs 27, 29 passing through the body 26. At one end of and between the prongs 27, 29, a thin platinum wire 28 is mounted, and when the heated element 5 is attached to the oscillator 15 the wire 28 is located in the oscillation channel 22. The ends of the prongs 27, 29 opposite the ends fitted with the wire 28 are connected to the control means 6 which supplies the heated element 5 with a constant electrical current flowing from one prong 27, via the wire 28, to the other prong 29 for heating the wire 28 to a temperature of, for example, 60° C. (140° F.).

When a fuel filling operation is started, the stream of fuel F and the stream of vapor V are produced. Simultaneously, the control means 6 receives three input values of which the first one is the temperature of the stream of fuel vapor, which is provided by means of the temperature sensor 18. The second value is a voltage across the wire 28 and the third value is the vapor flow rate measured by the flow meter 25.

When the stream of vapor V passes the wire 28, the vapor cools the wire 28 which results in a decreased voltage across the wire. If the vapor has a high density, or high content of hydrocarbon (non-ORVR vehicle), the wire 28 is cooled more than if the density, or hydrocarbon content, was low (ORVR vehicle), since hydrocarbon has a greater cooling effect than air.

A relatively higher cooling of the wire 28 results in a lower resistance of the wire 28, and since the electrical current through the wire 28 is constant, a low voltage means a high hydrocarbon content while a high voltage means that substantially no hydrocarbon is present.

Data tables where a high voltage level, or a predetermined voltage level (level for a ORVR-vehicle), is read as a function of the flow rate is stored in the control means 6. Each data table has a specific temperature interval, such as 5° C. (41° F.), and the measured temperature determines which data table to employ, i.e. the measured temperature shall fall within the temperature interval of the selected data table.

During operation the voltage across the wire 28 is continuously measured and compared with the predetermined voltage level, which is obtained from the data tables on basis of the temperature and flow rate. If the voltage is above the predetermined level an ORVR fitted vehicle is detected, and the vapor pump 4 is stopped or the vapor valve 7 is closed.

The data tables for determining the high, predetermined voltage levels discussed above are generated by running tests for vapor streams having a vapor content typical for ORVR-fitted vehicles as well as for non-ORVR fitted vehicles. During the tests, the flow rate is varied within the operational range of flow rate of the vapor recovery system (typically 0-60 liters/min), and the tests are performed within temperature intervals of 5° C. (41° F.), for example between −20° C. (−4° F.) and 50° C. (122° F.). Resulting voltage levels are continuously measured and the predetermined high voltage level (ORVR-vehicle) is stored as a function of the flow rate at a respective temperature interval. In other words, a specific wire voltage is determined to correspond with a specific cooling of the heated element 5.

The voltage level defining an ORVR vehicle depends, of course, on the configuration of the vapor recovery system and its constituting parts. The voltage levels may also be theoretically determined by applying hot wire functions in combination with functions for thermal conductivity.

Moreover, instead of using data tables for deciding the predetermined voltage, a function may be determined which has the vapor flow rate and temperature as input variables for calculating the predetermined voltage.

Of course, the heated element 5 may be arranged anywhere in the vapor line 3, as long as it is subjected to sufficient cooling from the a the vapor stream V.

Moreover, the flow rate of the stream of fuel vapor V may be determined to be the flow rate of the stream of fuel F, since the flow rate through the vapor line 3 generally corresponds to the flow rate of the fuel line 10.

The invention claimed is:

1. A vapor recovery system for recovering fuel vapor from a vehicle tank during dispensing of fuel into the vehicle tank at a fuel dispensing flow rate, said vapor recovering system comprising a vapor recovering line for transporting a stream of fuel vapor, and a controller, wherein a flow meter is arranged in or adjacent to the vapor recovery line for indicating the flow rate of the stream of fuel vapor, a heated element is arranged in the vapor recovery line, and the controller is configured to:
   detect a cooling exerted on the heated element by the stream of fuel vapor,
   determine a correction for the detected cooling by weighting said cooling with the flow rate of the stream of fuel vapor to compensate for an increase in cooling as the vapor flow rate increases, and
   decrease or stop the stream of fuel vapor, if after correction, the detected cooling is smaller than a predetermined level.

2. A vapor recovery system according to claim 1, wherein the correction for the detected cooling comprises increasing said predetermined level as the flow rate increases.

3. A vapor recovery system according to claim 1, further comprising a temperature sensor operatively connected to the controller and arranged to measure the temperature of the stream of fuel vapor, the controller configured to determine a correction for the detected cooling by weighting said cooling with the measured temperature.

4. A vapor recovery system according to claim 3, wherein the correction for the detected cooling comprises decreasing said predetermined level as the temperature increases.

5. A vapor recovery system according to claim 1, wherein the flow meter comprises a fluid oscillator for providing an oscillation of at least a party of the stream of fuel vapor.

6. A vapor recovery system according to claim 5, wherein the fluid oscillator is configured to provide a frequency oscillation which increases with an increased vapor flow.

7. A vapor recovery system according to claim 5, wherein the heated element is arranged at least partly in the oscillating part of the stream of fuel vapor.

8. A vapor recovery system according to claim 1, wherein the heated element is supplied with an electrical current for providing the heating of the heated element, said cooling being determined by the voltage across, and electrical current through, the heated element.

9. A vapor recovery system according to claim 1, wherein the controller is configured to estimate any of the density and the hydrocarbon content of the stream of fuel vapor, based on the cooling exerted on the heated element.

10. A vapor recovery system according to claim 1, wherein the heated element is supplied with an electric current for providing the heating of the heated element and the controller is configured to detect the cooling exerted on the heated element by the stream of fuel vapor by determining a voltage value across the heated element at a constant current.

11. A method of regulating a vapor recovery system when recovering fuel vapor from a vehicle tank during dispensing of fuel into the vehicle tank at a fuel dispensing flow rate, said method comprising the steps of:
    transporting a stream of fuel vapor through a vapor recovery line,
    detecting a flow rate of the stream of fuel vapor by a flow meter arranged in or adjacent to the vapor recovery line,
    detecting a cooling exerted on a heated element by the stream of fuel vapor,
    determining a correction for the detected cooling by weighting said cooling with the flow rate of the stream of fuel vapor to compensate for an increase of cooling as the flow rate increases, and
    decreasing or stopping the stream of fuel vapor, if after correction, the detected cooling is smaller than a predetermined level.

12. A method of regulating a vapor recovery system according to claim 11 further comprising supplying an electric current to the heated element, wherein detecting a cooling exerted on a heated element by the stream of fuel vapor comprises detecting a cooling exerted on the heated element by the stream of fuel vapor by determining a voltage value across the heated element at a constant current.

13. A fuel dispensing unit including a vapor recovery system for recovering fuel vapor from a vehicle tank during dispensing of fuel into the vehicle tank at a fuel dispensing flow rate, said vapor recovery system comprising a vapor recovery line for transporting a stream of fuel vapor, and a controller, wherein a flow meter is arranged in or adjacent to the vapor recovery line for indicating the flow rate of the stream of fuel vapor, a heated element is arranged in the vapor recovery line, and the controller is configured to:
    detect a cooling exerted on the heated element by the stream of fuel vapor,
    determine a correction for the detected cooling by weighting said cooling with the flow rate of the stream of fuel vapor to compensate for an increase in cooling as the vapor flow rate increases, and
    decrease or stop the stream of fuel vapor, if after correction, the detected cooling is smaller than a predetermined level.

* * * * *

UNITED STATES PATENT AND TRADEMARK OFFICE
CERTIFICATE OF CORRECTION

PATENT NO.         : 7,647,951 B2
APPLICATION NO.    : 11/861525
DATED              : January 19, 2010
INVENTOR(S)        : Bengt I. Larsson et al.

It is certified that error appears in the above-identified patent and that said Letters Patent is hereby corrected as shown below:

Claim 1, column 5, line 12 and column 5, line 13, for the word "recovering", each occurrence, should read --recovery--.

Claim 5, column 5, line 42, for the word "party", should read --part--.

Signed and Sealed this

Thirtieth Day of March, 2010

David J. Kappos
*Director of the United States Patent and Trademark Office*